(12) United States Patent
McFarling

(10) Patent No.: US 6,374,349 B2
(45) Date of Patent: *Apr. 16, 2002

(54) BRANCH PREDICTOR WITH SERIALLY CONNECTED PREDICTOR STAGES FOR IMPROVING BRANCH PREDICTION ACCURACY

(76) Inventor: Scott McFarling, 750 N. Shoreline Blvd. Apt. 39, Mountain View, CA (US) 94303-3253

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,306

(22) Filed: Mar. 19, 1998

(51) Int. Cl.[7] .................................................. G06F 9/44
(52) U.S. Cl. ...................................... 712/239; 712/233
(58) Field of Search ................................... 712/233–240

(56) References Cited

U.S. PATENT DOCUMENTS

| | | | | |
|---|---|---|---|---|
| 4,370,711 A | * | 1/1983 | Smith | 712/240 |
| 5,564,118 A | * | 10/1996 | Steely | 712/240 |
| 5,687,360 A | * | 11/1997 | Chang | 712/240 |
| 5,752,014 A | * | 5/1998 | Mallick | 712/240 |
| 5,758,142 A | * | 5/1998 | Mcfarling | 712/239 |
| 5,857,098 A | * | 1/1999 | Talcott | 712/240 |
| 5,978,909 A | * | 11/1999 | Lempel | 712/240 |
| 6,081,887 A | * | 6/2000 | Steely | 712/239 |

OTHER PUBLICATIONS

Driesen, K. et al., "The cascaded predictor: economical and adaptive branch target prediction", 11/98, pp. 249–258.*
Chang, Po–Yung et al., "Alternative implementations of hybrid branch predcitors", 11/95, 252–257.*
Microsoft, Microsoft Press Computer Dictionary, Third Ed., 1997, pp. 72 and 402.*

* cited by examiner

Primary Examiner—John F. Niebling
Assistant Examiner—Stacey Whitmore
(74) Attorney, Agent, or Firm—Carr & Ferrell LLP; Eppa Hite

(57) ABSTRACT

System for accurately predicting the outcome of conditional branch instructions subject to execution in a pipelined processor digital computer. The system comprises a series of predictor stages utilizing different prediction algorithms. The stages are linked to successively refine branch predictions only where prediction accuracy from a previous stage is likely to be improved by a subsequent stage. Improvements to each stage and techniques for stage linkage are described.

28 Claims, 20 Drawing Sheets

Fig. 11

| Bimodal Counter State | Branch Direction | Initial History Value |
|---|---|---|
| 00 | T | 11....110001 |
| 01 | T | 11....100011 |
| 10 | N | 00....011100 |
| 11 | N | 00....001110 |

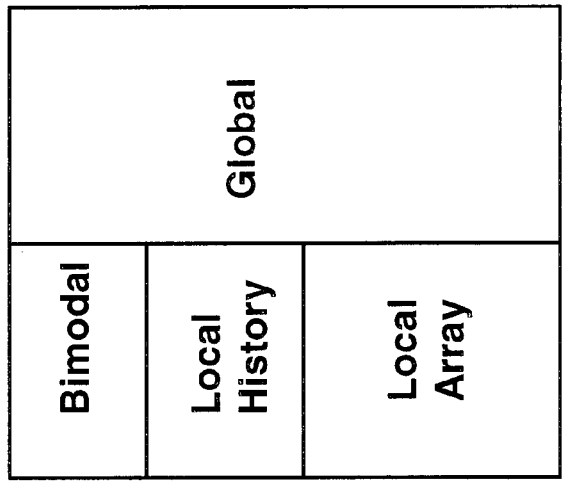
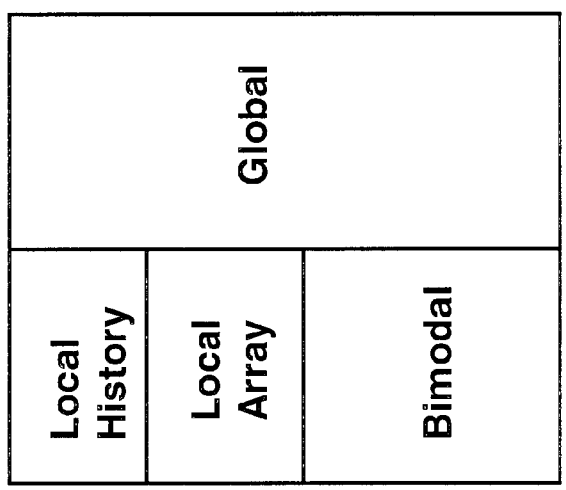
Fig. 15

Fig. 16

| Bimodal Counters (log2) | 7 | 8 | 9 | 9 | 10 | 11 | 12 | 13 | 14 | 15 | 16 |
|---|---|---|---|---|---|---|---|---|---|---|---|
| Local History Entries (log2) | 3 | 4 | 5 | 6 | 7 | 8 | 9 | 10 | 11 | 12 | 13 |
| Local History Tag Bits | 6 | 6 | 6 | 6 | 6 | 6 | 6 | 6 | 6 | 6 | 6 |
| Local History Bits | 6 | 6 | 6 | 8 | 8 | 8 | 10 | 12 | 12 | 12 | 12 |
| Local Counters (log2) | 6 | 7 | 8 | 10 | 11 | 12 | 13 | 14 | 15 | 16 | 17 |
| Global Entries (log2) | 6 | 7 | 8 | 9 | 10 | 11 | 12 | 13 | 14 | 15 | 16 |
| Global Tag Bits | 7 | 7 | 7 | 7 | 7 | 9 | 9 | 9 | 9 | 9 | 9 |
| Total Size (Bytes) | 132 | 264 | 528 | 1.1K | 2.1K | 4.8K | 9.7K | 19K | 39K | 77K | 146K |

BRANCH PREDICTOR WITH SERIALLY CONNECTED PREDICTOR STAGES FOR IMPROVING BRANCH PREDICTION ACCURACY

BACKGROUND OF THE INVENTION

1. Field of the Invention

The present invention relates generally to computer system central processors and more particularly to predicting outcomes of conditional branch instructions.

2. Description of the Background Art

Computer designers have developed a number of techniques to improve the performance of various computer architectures. These techniques include forms of memory caching and hardware parallelism, including pipelining.

Pipelined processors decompose the interpretation and execution of instructions into separate operations that can be performed in parallel, or simultaneously. Each processor stage of a pipelined processor can, ideally, complete one operation from an instruction during each machine cycle and pass the instruction on to the next stage. In theory, the effective speed of a P-stage pipelined processor is thus P times the speed of a non-pipelined equivalent, since pipelined processors need not wait until one instruction is completely finished before execution of the next instruction can begin.

Various practical limitations on pipeline performance can prevent a pipelined processor from achieving this theoretical improvement in performance. One of the most important of these limitations occurs when the sequence of instructions to be executed is not known in advance. In particular, the instruction to be executed next after a conditional branch instruction may not be known for certain until after the conditional branch is executed. In this case, the pipeline will have to wait, and performance suffers.

This application makes use of the following convention: conditional branch instructions test a condition specified by the instruction. If the condition is true, then the branch is "taken" (T); that is, instruction execution begins at the new address specified by the instruction. If the condition is false, the branch is "not-taken" (N) and instruction execution continues with the instruction sequentially following the branch instruction. Since most program code contains a large number of such branches, their impact is very significant. Avoiding branch condition delay penalties is critical to improving pipelined processor performance.

Branch prediction is the anticipatory designation of the branch condition. By predicting the direction of the conditional branch, the processor can, while waiting for branch condition resolution, begin or prepare to begin execution of the next instructions in that path. In other words, branch prediction mechanisms guide the pre-fetching or the conditional issuance of instructions in a particular path in an attempt to keep the pipeline full and free from stalls. Branch target prediction, i.e. prediction of specific address offsets or specific instructions to be executed, is not addressed by this invention.

Accurate prediction of branch instructions is vital to the efficient use of pipelines. Mispredicting a branch results in discarding much speculative work and delays execution of a program. If instructions in a wrong path have been fetched and decoded, those instructions must be flushed from the pipeline. The pipeline must then be loaded with new instructions corresponding to the correct path before the execution unit can resume processing. Conversely, since the correct instructions were not predicted and started early, an opportunity to advance is missed. Thus, a poor branch prediction scheme can have severe penalties that neutralize the potential parallelism advantages of a long processor pipeline.

Branch prediction techniques are typically categorized as static or dynamic. Static techniques make the same guess regarding branch direction each time a particular branch is encountered. One static branch prediction method simply assumes that all encountered branches follow a fixed assignment, i.e. they are either always "taken" or always "not-taken." The validity of this assumption can vary greatly with the type of program being executed. For example, many branches are programmed merely for management of potential but rare error conditions, so for such branches it would usually be correct to predict that all branches are "not-taken." Another static method is to use only the direction of the branches to make a prediction. The branch is predicted to be "taken" if the branch is backward, i.e. the target address is earlier in the program listing than the branch instruction; otherwise the branch is predicted to be "not-taken." This strategy detects loops in a program and works particularly well when loops are iterated many times, as in scientific programs with equation evaluation loops. Fairly high prediction accuracy is possible with static predictors for loop control branches, but the exit from the loop is incorrectly predicted by this strategy. Yet another static method is to use information from compilation and pre-execution of the program as a profile to guide branch prediction. Ideally, the compiler can assign a branch prediction to every branch in the program, but there are drawbacks to this approach, i.e. pre-execution takes time, and it is not widely used. In the applications where static predictors work well, the outcome of any one branch tends to be independent of the outcomes of other branches.

There are many workloads where control transfers are intensive and thus the relation between branches is not as simple as the situations described above. The outcomes of branch decisions for such applications are usually neither constant nor looping, but are strongly affected by their own past histories and by the outcomes of preceding branches. Static branch prediction methods are therefore generally not adequate for accurately predicting actual program behaviors, and in some cases can actually reduce the branch prediction accuracy below that achievable by mere chance.

Dynamic branch prediction schemes differ from static schemes in that they base their predictions on the actual run-time behaviors of program branches. The execution sequence that a program follows can vary in ways that cannot be predicted by static algorithms. Different input data during different program runs can cause differences in execution sequences that neither optimizing compilers nor static mechanisms can successfully predict. A branch might also execute consistently one way in one part of a given program run, but the other way in another part of the run, so only a branch predictor that adapts to these changes during execution can make accurate predictions. Although branch outcomes are variable, they are usually not the result of random activities; most of the time they are correlated with past branch behavior. By keeping track of the history of branch outcomes, it is possible to anticipate with a high degree of certainty which direction future branches will take, and therefore to optimize program execution. Dynamic branch predictors are popular because they can be implemented entirely in hardware and can therefore accurately predict branches without changes to the processor instruction set or to compiled programs. All of the various dynamic branch prediction methods that have been proposed use the history of previous branches to predict how a current branch will behave.

Bimodal Predictor

Most conditional branches behave in a bimodally biased manner; they are either "taken" most of the time, or "not-taken" most of the time. The assumption that the most recent branch directions represent the probable next branch direction is usually valid, so the past behavior of the branch can provide some predictability about the future behavior of the branch. In U.S. Pat. No. 4,370,711 by Smith, an array of 2-bit saturating up/down counters is proposed to store information about the recent history of each branch in a program. FIG. 1 is a block diagram of a typical bimodal predictor. Each counter 10 in the branch counter array 12 is addressed by the low order bits of the address of the branch instruction on line 14 in the program counter; building a full array addressed directly by all the program counter bits would be uneconomical. FIG. 2 shows a state diagram for a 2-bit saturating up/down counter. When a particular branch is "taken," the respective counter is incremented. Each time the branch is "not-taken," its counter is decremented. The counters saturate, i.e. they do not count above three or below zero. Counter saturation guarantees that the predictor can adapt relatively quickly to new programs, phases of execution, or input data, in contrast to simple static predictors. A count in the upper half of the range (10 or 11) predicts that the branch will be taken; a count in the lower half (00 or 01) predicts that it will not. Branches are thus binned into four categories, strongly-taken, weakly-taken, weakly not-taken, and strongly not-taken.

Smith observed empirically that a 2-bit counter provides an appropriate amount of damping to changes in branch direction. A 1-bit counter simply records the single most recently executed branch direction and does not average recent executions. The 2-bit counter captures more of the recent branch history, so the predictor is more tolerant of a branch going in an anomalous direction. For example, with the stream of branch executions . . . NNNTNNN . . . , the 1-bit predictor gives two mispredictions, the first when the branch is anomalously "taken," and the second when it is subsequently "not-taken." Use of a 2-bit counter results in only one incorrect prediction in this situation. Generally, the 2-bit counter's branch prediction should not reverse during an extended bimodally biased sequence unless the branch goes the unlikely direction twice in a row. There are exceptional situations that can cause Smith's 2-bit counter-based predictor to predict wrongly all the time, e.g. the alternating sequence TNTNTN . . . , when starting from initial state 01. Such situations are rare, though, so 3-bit or higher counters do not appear to offer any significant advantage over 2-bit counters, considering their additional hardware cost.

Another advantage of using a count becomes apparent when a collision occurs, i.e. more than one branch instruction happens to address the same location in the branch counter array. When this happens, a count tends to result in a "vote" among the branch instructions that map to the same index, and predictions are made according to the way the "majority" of the more recent decisions were made. This helps maintain high prediction accuracy, although not as high as if there were no collisions.

Local Predictor

A particular branch instruction will often execute in repetitive patterns during program execution. A loop control branch is a common example of this behavior. A loop control branch with three evaluations followed by an exit will have a branch history of the form TTTNTTTN . . . as the loop is evaluated ("taken") three times before the loop is exited ("not-taken"). A dynamic branch predictor that tracks the pattern recently executed by a particular branch instruction (e.g. TTTN) can detect recurrences of such patterns and use them to alter its prediction accordingly. Such mechanisms are referred to as "local" predictors, as only information local to each branch is used for prediction. This concept, devised independently by Yeh (Tse-Yu Yeh and Yale N. Patt, A Comparison of Dynamic Branch Predictors that use Two Levels of Branch History, The 20$^{th}$ Annual International Symposium on Computer Architecture, May 16, 1993, at 257) and by Steely (U.S. Pat. No. 5,564,118), has many different implementations.

FIG. 3 is a block diagram of a typical local predictor. As in the bimodal counter, the local predictor uses an array 30 of saturating 2-bit up/down counters 32, and the prediction on line 34 is simply the most significant bit of a given counter. Unlike the bimodal counter, however, each counter in the local predictor array is indexed not only by the low order branch instruction address bits on line 36, but also by the pattern of directions on line 38 recently taken by that particular branch. Each branch instruction address can be thought of as an index into a first-level table, and a combination of history and address information acts as an index into a second-level table. The historical path pattern 39 is stored in an array of shifted values that is updated after the branch instruction is executed; the oldest history bit is shifted out and discarded. With the complete index (address and pattern) available, the local predictor can access a particular counter to pick off its most significant bit as the path prediction. Local predictors are significantly more accurate than bimodal predictors, but require more hardware to implement.

Global Predictor

The behavior of different branch instructions in a program is not always independent, but rather can be correlated, as taught by Pan in U.S. Pat. No. 5,553,253. The trail of program execution that has previously led to a particular branch instruction may be "well-worn," i.e. frequently followed, and therefore likely to be taken again. Predictors that track the recent history of all branch instruction outcomes to detect recurring paths of program execution are known as "global" predictors. FIG. 4 is a block diagram of a typical global predictor, which is similar in construction to a local predictor, except that instead of individual registers for each branch there is only one history register 40 global to all branches. Each counter in the array is indexed by the branch instruction address and by the global history register on line 42.

Global predictors can predict branch behaviors that other predictors cannot. In cases where the same variable is compared to different values at different steps in program execution, global predictors can use the history of initial comparisons to help predict subsequent comparisons. For example, in the following code, if (x>1) then y=12;
if (x>2) then z=3;

if the first branch is "not-taken," the second branch will always also be "not-taken," so there is perfect branch correlation. If the first branch is "taken," there is no conclusive knowledge of the path the second branch will follow, but after some initialization period there is a historical bias that can be used for making a prediction.

Gshare Predictor

Often there are only a few paths taken to reach a particular branch. In this case, the branch instruction address and the global history register will be highly correlated and to that extent redundant. That is, if a system knows which branch it is executing, it usually has good evidence of how it got there. McFarling proposed a predictor, called a global shared index or "gshare" predictor, that can take advantage of this situation (Scott McFarling, Combining Branch Predictors, Technical Note TN-36, Digital Equipment Corporation Western Research Laboratory, June 1993). As shown in FIG. 5, a typical gshare predictor uses the branch instruction address on line 50 XOR'ed with the global history register 52 to index the array of counters 54. This hashing allows using more history bits and more address bits with the same number of counters, improving global prediction accuracy.

Parallel Predictor

The different branch predictors described have different advantages. Global predictors work well when branches are correlated with their neighbors. Otherwise, a bimodal or a local predictor may be better. The bimodal predictor adapts quickly and is small because it retains only a very limited amount of information about each branch. Bimodal predictions are good for branches that are strongly biased one way or another, which is a very commonly occurring pattern in typical programs. Local predictors can be much larger than bimodal predictors because they retain and use much more history of branch behavior. A large local predictor is generally much more accurate than a bimodal predictor since it can detect more complex behavior patterns. However, a small local predictor can actually be worse than a bimodal predictor if there are too many collisions (same address bits used) between branches for entries in the branch history table. Bimodal predictors can suffer similar conflicts, but since counters are small it is relatively easy to minimize collisions by simply increasing the number of counters. The global predictor can detect correlated or dependent branches better than other predictors can, but it may need a very large counter array to handle all possible cases. Program size can also influence predictor performance; bimodal predictors work better with large programs, while local predictors work better with small programs.

Selection of the particular type of predictor with the best accuracy under the circumstances can increase overall prediction accuracy and therefore processor throughput. Each type of branch predictor described in the prior art has distinct advantages corresponding to distinct patterns of branch instruction behavior found in typical programs. Multiple predictors can be combined to match a given predictor to the particular pattern of program behavior to which it is best suited. FIG. 6 is a block diagram of one type of multiple predictor proposed by McFarling (Id. at 11). This predictor has two independent predictors 60, 62 operating in parallel, with an additional array of 2-bit saturating up/down counters 64 to keep track of which predictor is more accurate for the branches that share that counter. This second array of counters switches between the two predictors to select one for a final prediction. Unfortunately, the parallel predictor is plagued by redundant computation and relatively high required memory capacity. These problem areas are not limited to the parallel predictor, but rather illustrate the general arena in which multiple-predictor design can be improved.

SUMMARY OF THE INVENTION

The invention provides an improved accuracy branch prediction mechanism to minimize the time lost to erroneous predictions that necessitate both a purge and a reload of all affected pipelines in a processor. The present invention provides a serial branch predictor that includes a first component predictor operating according to a first algorithm to predict an action, and any number of subsequent component predictors operating according to alternate algorithms to predict the action. The first component predictor and the subsequent component predictors are coupled to each other serially, a predicted action of a preceding component being input to the subsequent component predictor. Such an arrangement provides a better prediction mechanism, since it serially combines multiple component predictors with varying characteristics to overrule the prediction from any prior component predictor if and only if an improvement in prediction accuracy is likely. Each subsequent stage therefore focuses on correction of predictions made by a prior stage. In the preferred embodiment, known as the SerialBLG predictor, the first predictor algorithm is bimodal, a second predictor algorithm is local, and a third predictor algorithm is global. Further, each stage is improved according to various methods.

BRIEF DESCRIPTION OF THE DRAWINGS

FIG. 11 is a table of serial branch predictor initialization values in accordance with the preferred embodiment of the present invention;

FIG. 15 is a block diagram of relative memory sizes of predictor stages for small and large predictors in accordance with the preferred embodiment of the present invention;

FIG. 16 is a table of predictor parameter values for various predictor sizes in accordance with the preferred embodiment of the present invention;

DETAILED DESCRIPTION OF THE PREFERRED EMBODIMENT

SerialBLG

Serial branch prediction uses multiple predictor stages, each of which passes its prediction on to the next stage. A prediction from a given stage will be overruled if and only if the next stage can refine the current prediction. All non-primary stages use the prediction from the prior stage as well as the available branch history and address information to improve prediction accuracy. This approach also sharply reduces the total predictor memory size because each stage has no need to handle the cases already properly handled by a previous stage; the prediction of the previous stage is likely to be overwritten only in those cases where the previous stage appears wrong. Each stage can focus on misprediction correction and does not need to repeat the work done by a prior stage. The preferred embodiment includes not only mechanisms for linking predictor stages in a serial manner, but also improvements to the predictor stages themselves.

Figure 1:
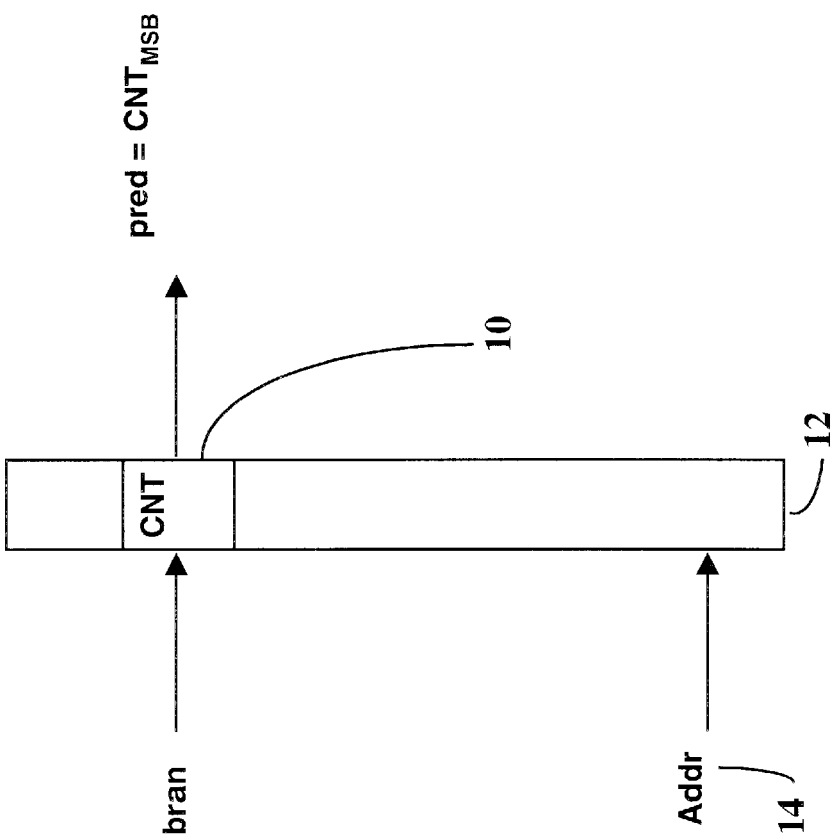
FIG. 1 is a block diagram of a bimodal predictor using a counter array.
Figure 2:
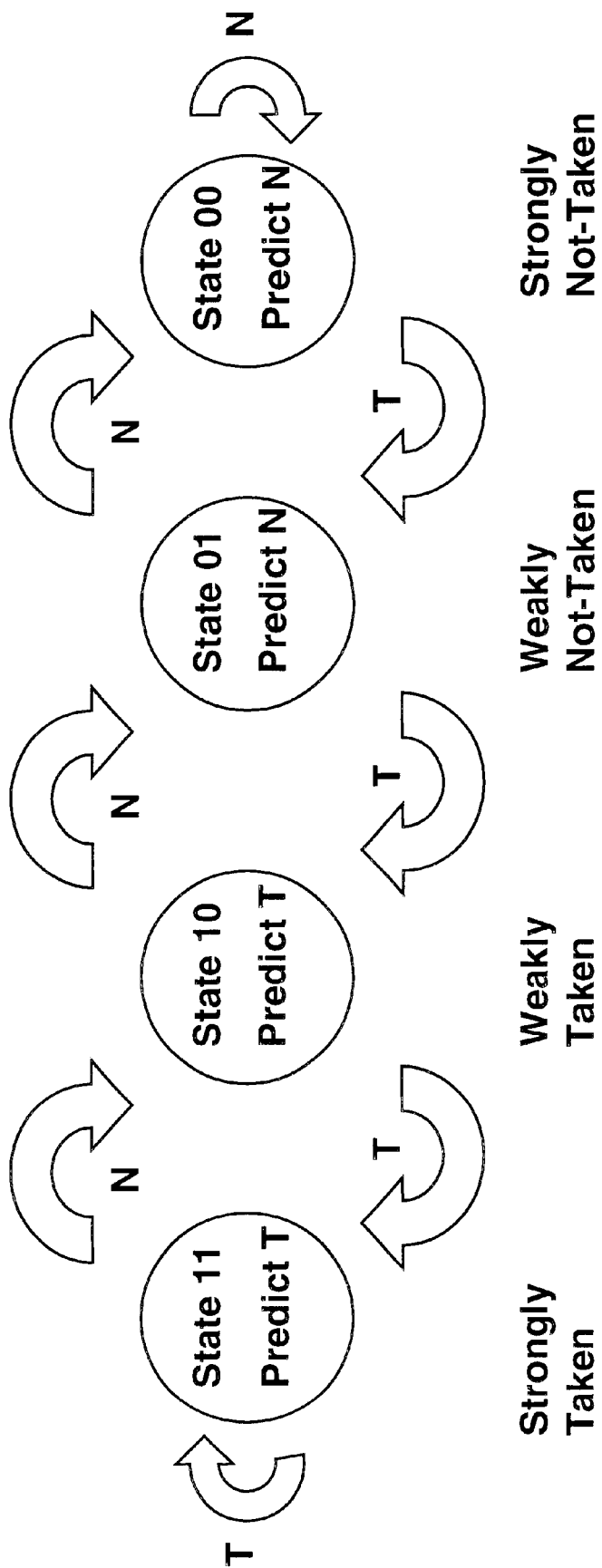
FIG. 2 is a state diagram of a saturating 2-bit up/down counter.
Figure 3:
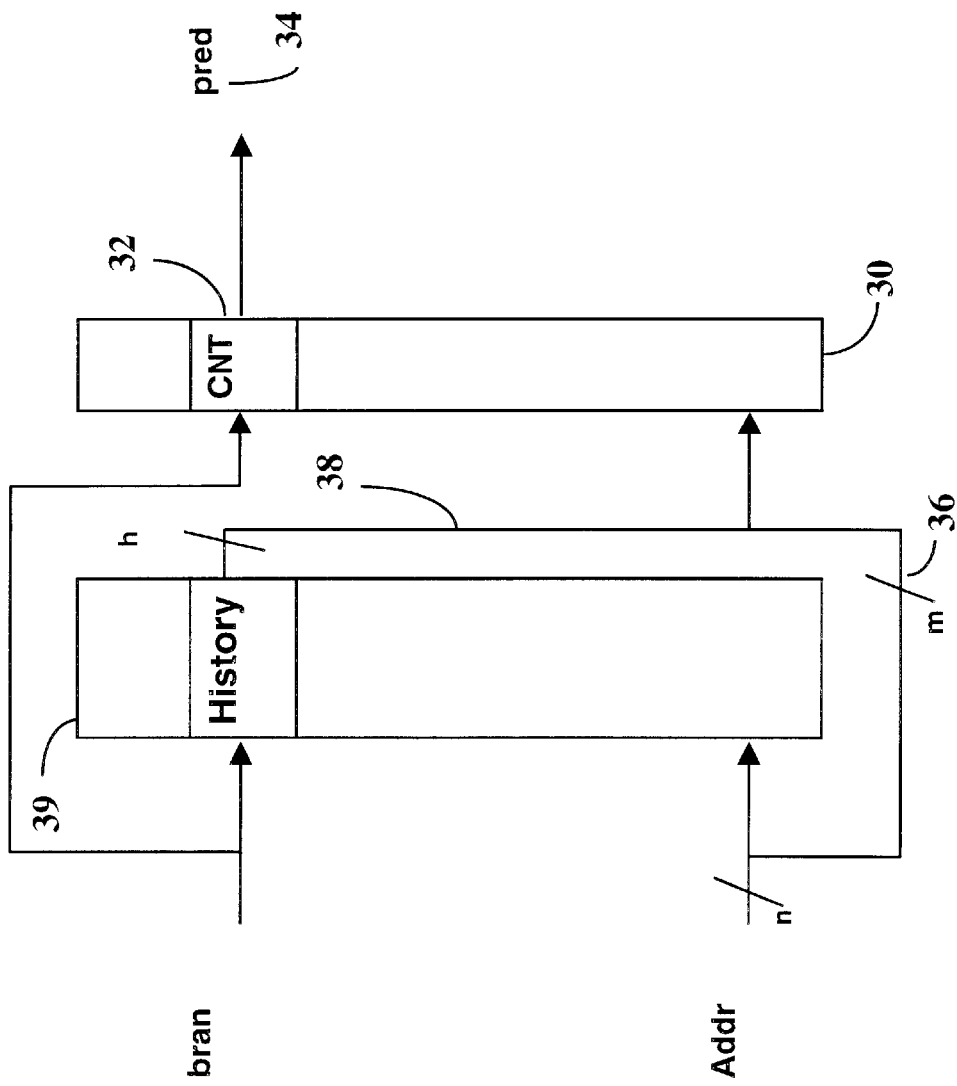
FIG. 3 is a block diagram of a local predictor featuring branch history and branch instruction address counter array indexing.
Figure 4:
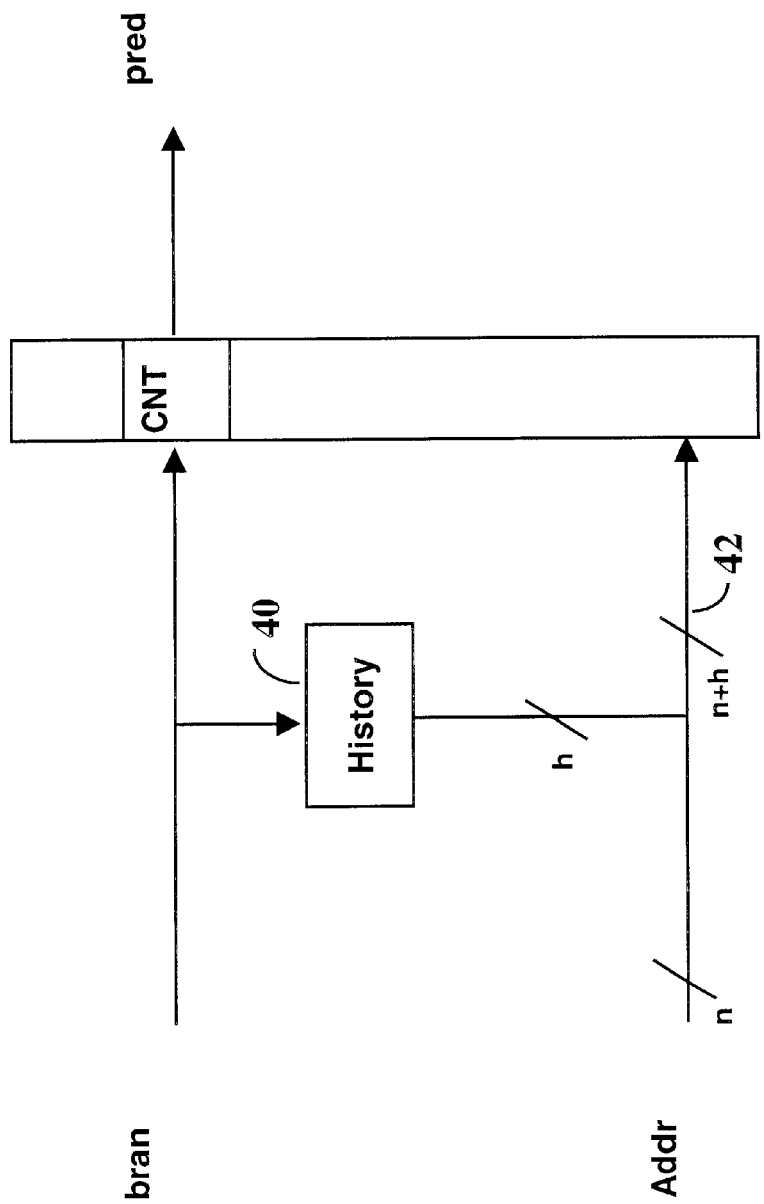
FIG. 4 is a block diagram of a global predictor featuring global history and branch instruction address counter array indexing.
Figure 5:
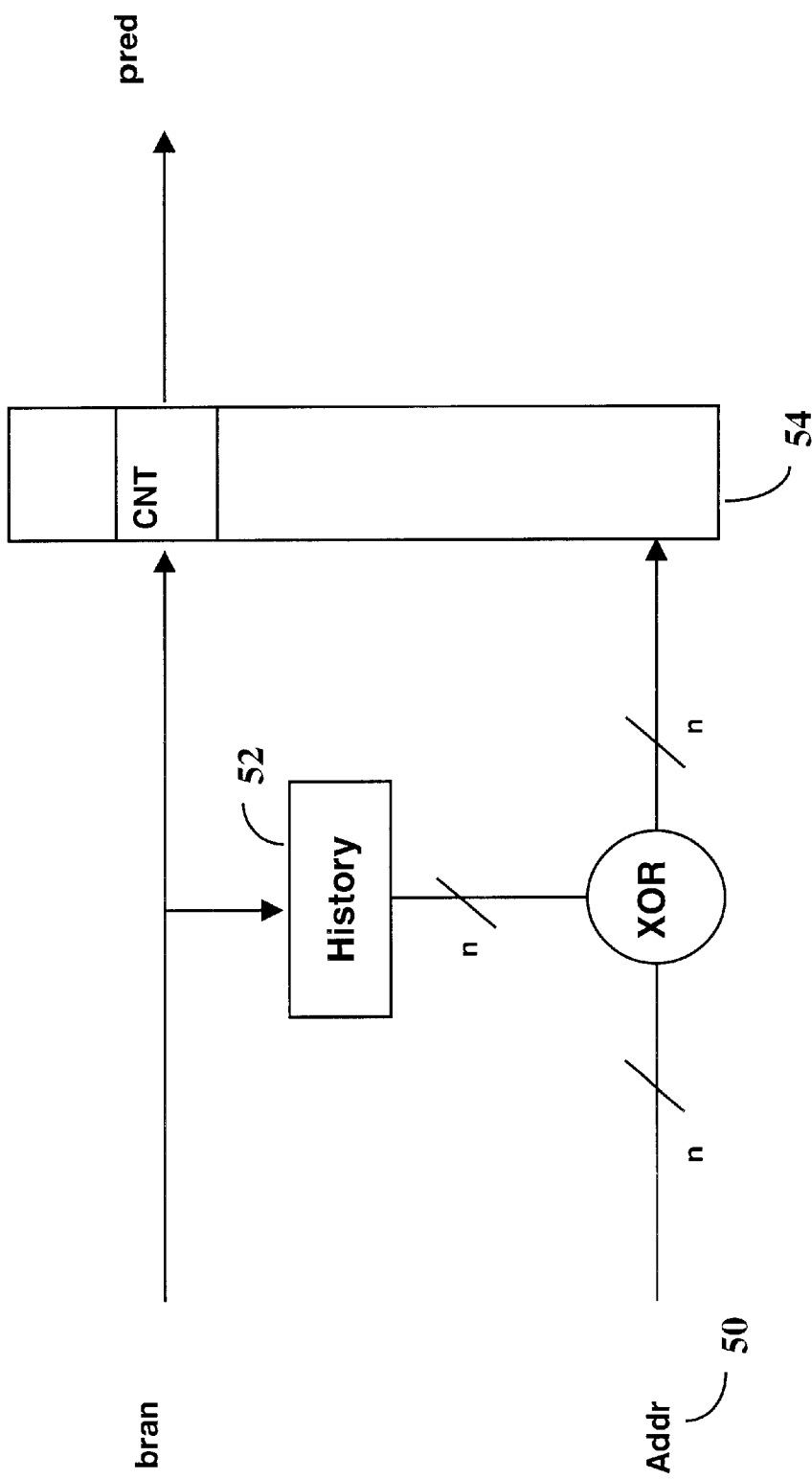
FIG. 5 is a block diagram of a gshare global shared index predictor featuring XOR'ed branch history and branch instruction address counter array indexing.
Figure 6:
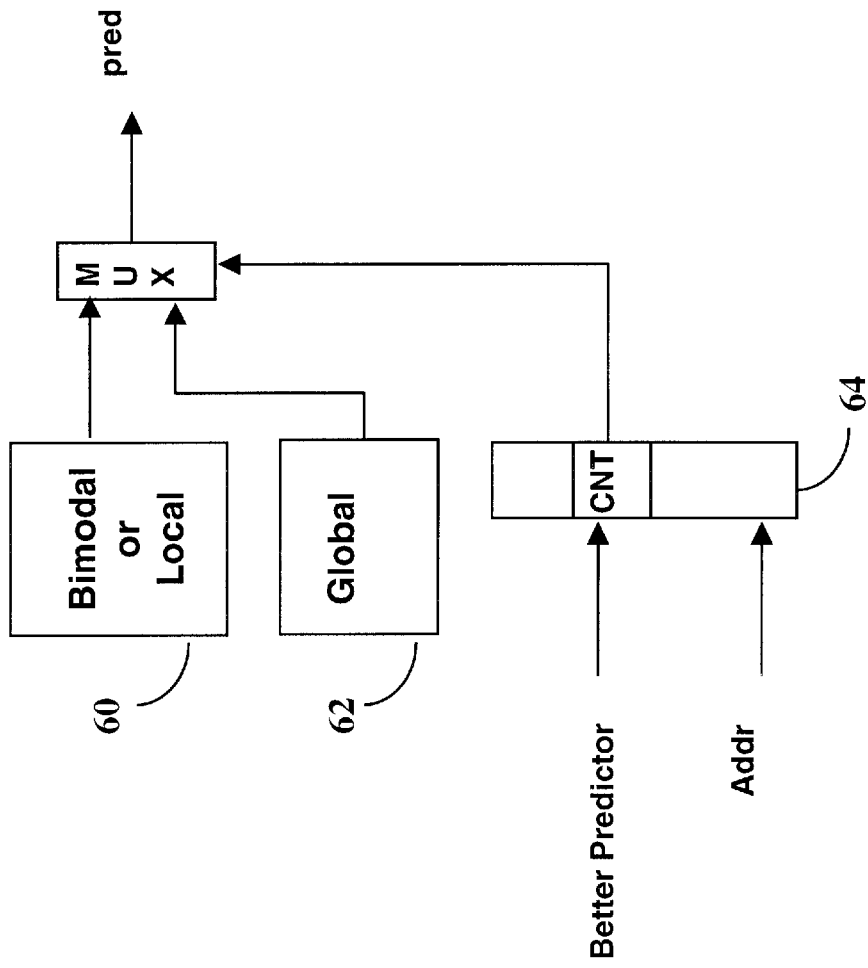
FIG. 6 is a block diagram of a parallel predictor featuring parallel predictors and a predictor selector mechanism.
Figure 7:
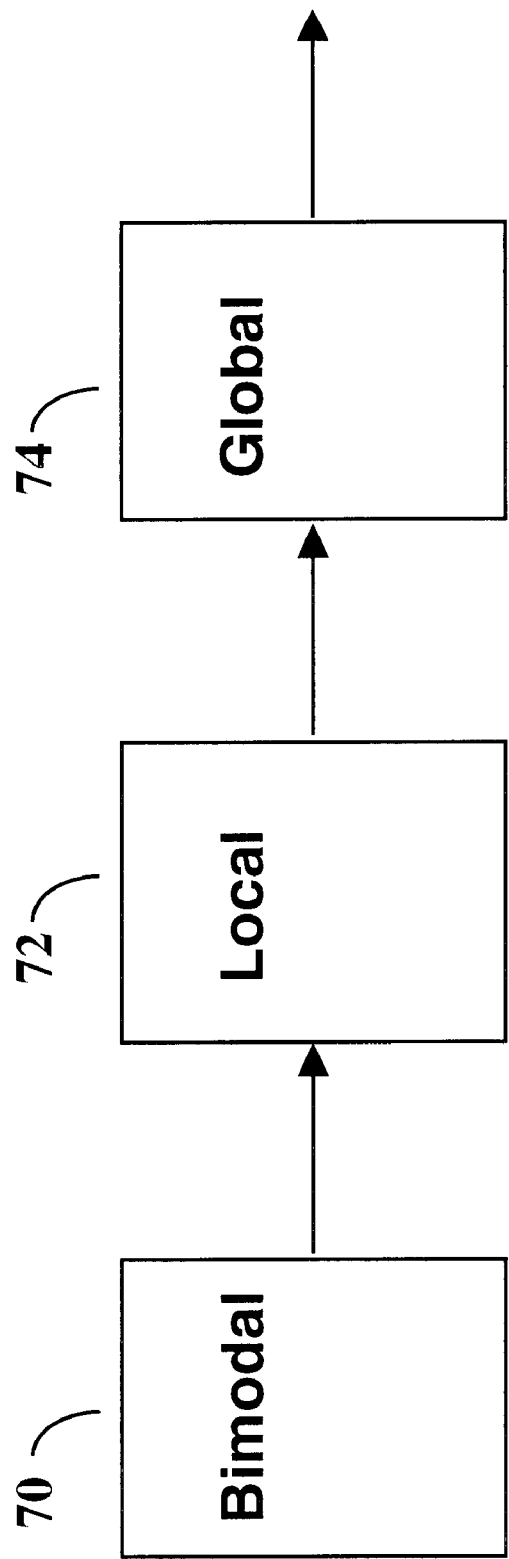
FIG. 7 is a block diagram of a serial branch predictor featuring bimodal, local, and global (BLG) branch predictors in accordance with the preferred embodiment of the present invention.
Figure 8:
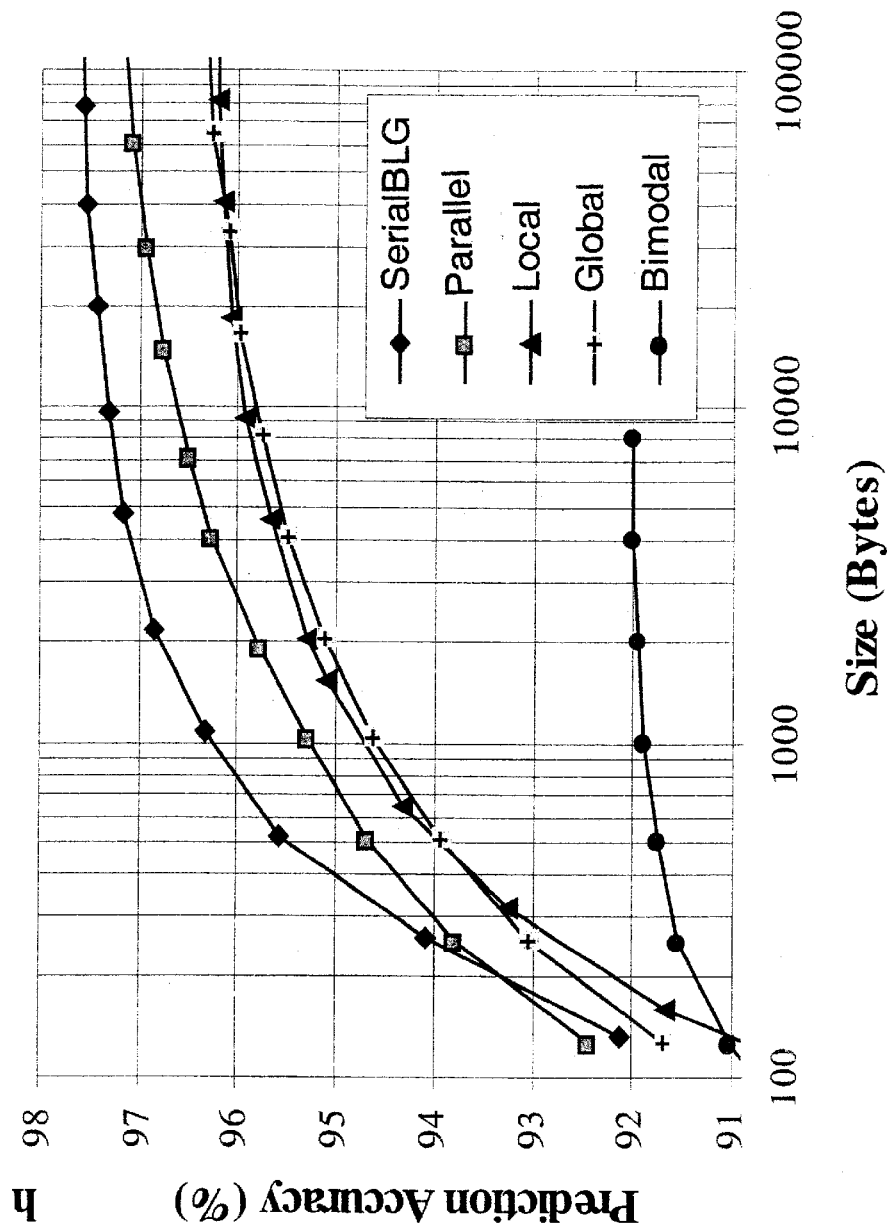
FIG. 8 is a graph of prediction accuracy as a percentage of branch executions versus predictor memory size for various predictor algorithms, including the superior accuracy of the preferred SerialBLG embodiment.

While there are many alternate ways that different predictors could be linked in series, the three-stage serial Bimodal/Local/Global (SerialBLG) combination has had the best accuracy in experimental tests and is the preferred embodiment. FIG. 7 is a block diagram of the SerialBLG branch predictor. Basically, the bimodal first stage 70 is an array of 2-bit saturating up/down counters, the local second stage 72 is a two-level predictor with local histories, and the global third stage 74 is a two-level predictor with global histories. Experimental results with the SerialBLG predictor show a 29–36% reduction in branch prediction errors compared to the two-level predictor described by Yeh (supra). For a given prediction accuracy, the new SerialBLG predictor is as much as 100 times smaller. FIG. 8 is a graph of predictor accuracy versus predictor size for a variety of predictors.

Cached Histories

As the size of programs run on a computer system increases, it becomes less practical to construct hardware structures large enough to track all possible branch histories. Cache mechanisms can be used to relieve this problem. Any of the common types of caches can be used, the type of cache used is not critical. While the history cache structure is similar to that of caches conventionally used in memory design, the history cache introduces several differences appropriate for use in prediction. A backing store of data is used to replace a cache entry in a memory cache in one step. The history cache has no such backing store of history information. Each line in the cache has a tag associated with a history entry. The tag contains some of the address bits of the particular branch whose history is stored in the history entry. It is not necessary to use all of the address bits of the branch, only enough to be able to eliminate most conflicts. There is much less demand for cache space because new cache entries are allocated only when there has been a final branch prediction error. In this manner, the predictor stage can effectively learn from errors after each prediction cycle is done. Only those branch histories that are needed to increase prediction accuracy beyond that of a prior stage's prediction are stored in the cache; this concept is used extensively in the predictor stages of this invention to cut required memory capacity.

After a new prediction error occurs, the predictor must prioritize the cache entries to be replaced. Not all errors will trigger a history entry replacement, some will simply update the history entry so that a particular branch will continue to be tracked. After a cache miss, i.e. when there is no history entry for a particular branch, the cache tag can be immediately changed, but it will take some time before all the history bits reflect the appropriate branch. Caches that utilize least recently used (LRU) replacement ordering should not change the LRU ordering when a cached history value does not yield a better prediction than that already available from a prior predictor stage. This replacement policy tends to help retain useful history entries, i.e. those which correct erroneous prior predictions, as opposed to those that are merely frequently addressed. This avoids redundancy between local and bimodal predictor stages.

Cached Counters

Caches can be similarly used to manage the information that would normally be stored in an impractically large array of counters. Cache entries are allocated and replaced only when predictor errors occur, further reducing hardware requirements.

Local Predictor Stage Improvements

Shift-or-Count Encoding

Figure 9:
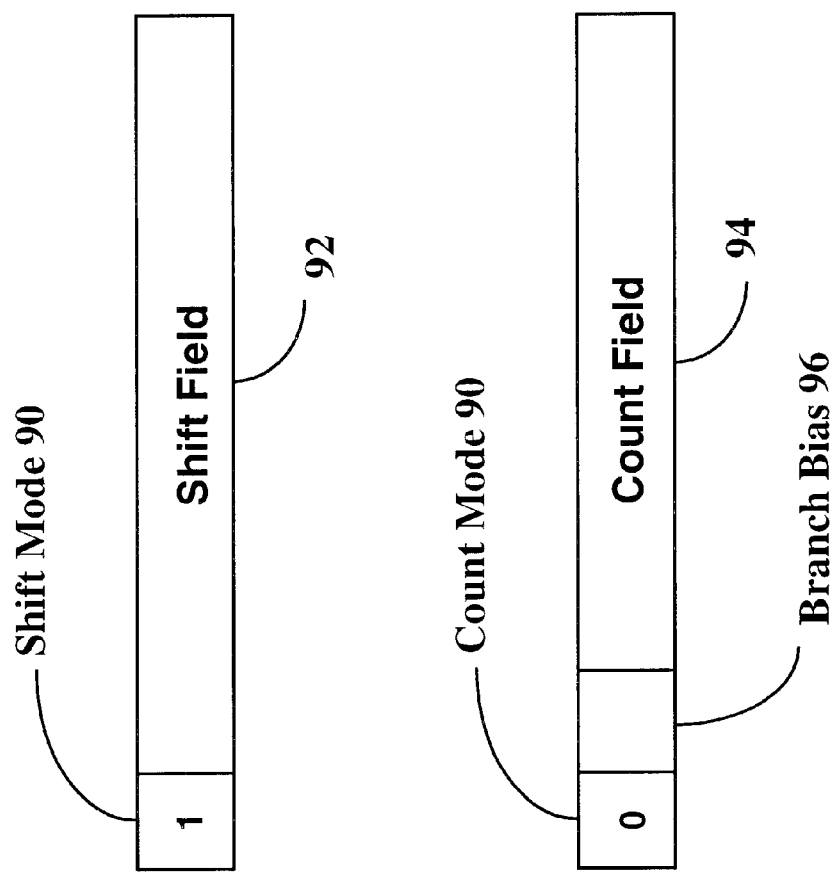
FIG. 9 is a block diagram of the shift-or-count encoding scheme in accordance with the preferred embodiment of the present invention.

FIG. 9 illustrates a method known as shift-or-count encoding for further reducing memory usage in predictor mechanisms. High loop counts require too much branch history storage. For very long iteration loops, such as loops having an iteration count of 100, the branch history pattern is very long (e.g. TTTTTT . . . N) but not otherwise different from that of a short iteration loop as described earlier (e.g. TTTN). Recognizing is needed to describe each branch taken in a long loop. Worse, the counter array would need at least $2^n$ counters, where n is the number of passes (99 in this case) made in a loop before exiting.

Local branch information can be encoded by a new method that reduces the memory required by a local predictor stage. Long loop branches can be detected with far fewer counters if the branch history entry is encoded with a count of how many times the branch has gone in the same direction. A mode bit 90 is reserved to switch between the conventional history storage (shift register) mode and the new counter mode. When the mode bit is set, the remaining bits in the branch history entry are just the shifted branch history as previously described. If the shift field 92 is either all zeroes or all ones, and the addressed branch goes the same direction again, the mode bit 90 and the count field 94 are set and the branch history table moves to count mode. In count mode, the branch history entry operates as a saturating counter, with one branch bias bit 96 showing the direction the branch usually goes (in this example, T), plus a count field 94. As the branch continues to execute in the same direction, the count is incremented, up to the maximum count value that can be represented. Finally, when the branch goes in the unusual direction, the mode bit 90 is set back to shift mode and the shift field 92 is set to the value one would expect if the encoder had stayed in shift mode. The following table illustrates the entries that toggle the shift-or-count encoder from one mode to the other.

| Current Branch History Entry | Branch Outcome | New Branch History Entry |
| --- | --- | --- |
| Shift: 0...0 | N | Count: 0, direction=0 |
| Shift: 1...1 | T | Count: 0, direction=1 |
| Count, direction=1 | N | Shift: 11...10 |

-continued

| Current Branch History Entry | Branch Outcome | New Branch History Entry |
|---|---|---|
| Count, direction=0 | T | Shift: 00...01 |
| Count, direction=1 | T | Increment counter to limit |
| Count, direction=0 | N | Increment counter to limit |

Partial Dominance

Figure 10:
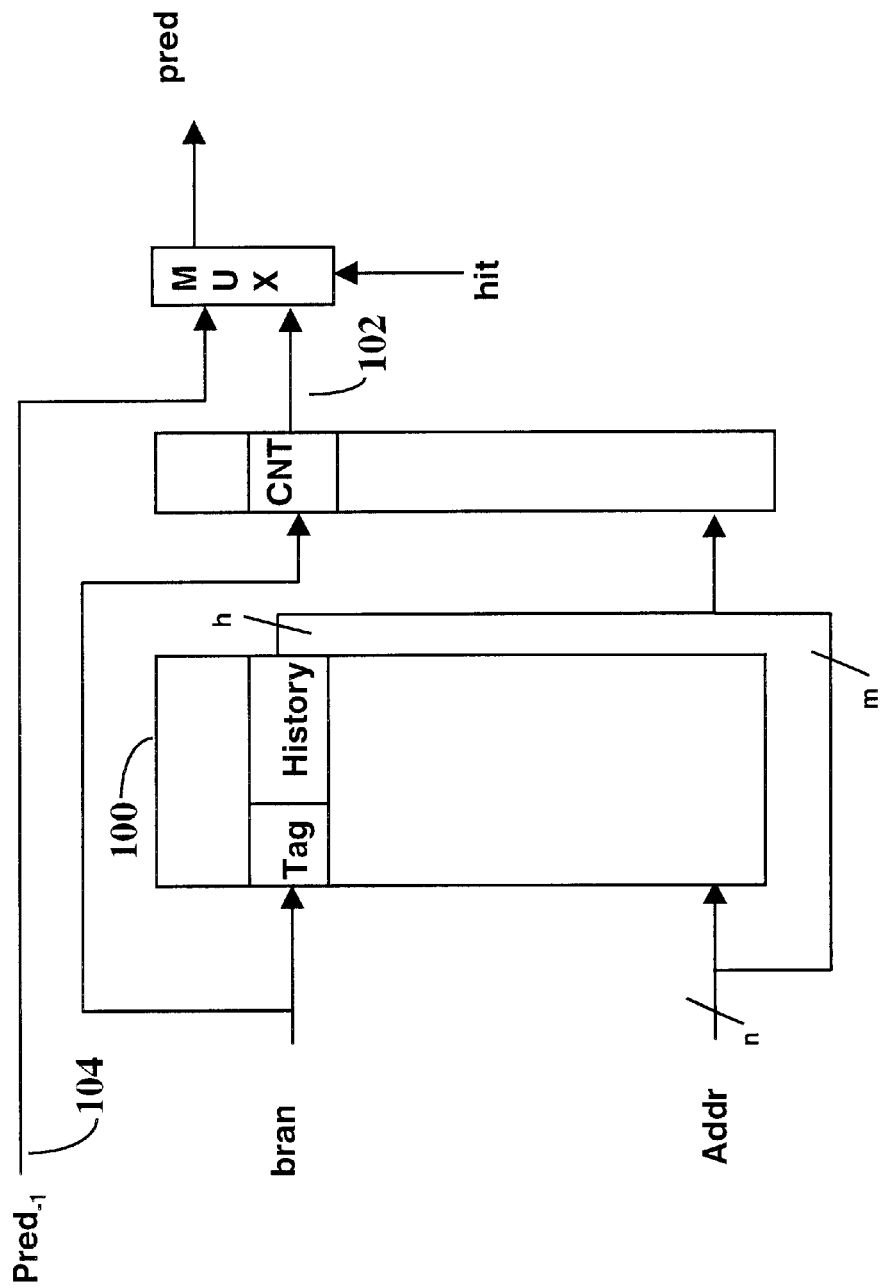
FIG. 10 is a block diagram of a local predictor stage using a local history cache in accordance with the preferred embodiment of the present invention.

The present invention provides a new combined predictor that retains the advantages of both bimodal and local predictors but does not suffer from their disadvantages, and allows the local predictor stage to cooperate with the prior bimodal predictor stage. The bimodal predictor stage always provides a prediction since it is an array, instead of a cache. FIG. 10 is a block diagram of a local predictor stage using a local history cache. If there is a hit in the local history cache 100, the local predictor stage has a prediction on line 102 available for use, and the prediction will be usually be better than or "dominant" over a bimodal stage prediction on line 104. This is because the local predictor stage uses more information about branch behavior than does the bimodal predictor stage.

The local predictor stage should not necessarily override the bimodal predictor stage in every instance though, as its prediction is only sometimes or "partially" dominant. When a cache miss occurs, the local predictor stage has no additional branch behavior information and therefore cannot improve over the prediction of the bimodal predictor stage. In that case, the bimodal prediction is allowed to stand. The partial dominance strategy uses a subsequent predictor stage to refine the prediction of a prior predictor stage only on those occasions when the latter stage prediction is available and more accurate than the prediction from a prior predictor stage. Following the partial dominance concept, the local prediction is used if there is a hit in the local history cache, otherwise the bimodal prediction is used. With the Serial-BLG predictor, the bimodal stage sets the final prediction unless it is overridden by either the local predictor or the global predictor; the local stage sets the final prediction if it can improve the prediction from the bimodal stage, unless the local stage is in turn overridden by the global predictor.

Selective Cache Entry Replacement

The partial dominance concept does not dictate that all local history cache misses cause a replacement. Histories should be stored only in the event of problems. If the branch prediction value coming from the bimodal predictor is already correct, it is not necessary to take a history entry from some other branch that may need it more. Also, there is no point in replacing a local history entry if the prediction from the final stage predictor is already correct. These two provisions reduce the number of replacements and substantially reduce the number of history entries needed to produce a good prediction.

Dominance Assurance via Consistent Initialization

The present invention also provides another method for insuring local dominance over a prior bimodal predictor stage. When the local history entry for a branch is replaced, the prior history is not available. The local branch prediction may therefore be wrong until several executions of the branch have been recorded. After a miss, the history entry can be initialized with a value consistent with the most recent result and the state of the bimodal counter for this branch to solve this problem. The local history is thus guaranteed to contain at least as much information about the branch as does the bimodal predictor. The best mode Serial BLG predictor uses the initialization values given in FIG. 11. Only the four cases in FIG. 11 are required, because no replacements are done if the bimodal prediction is correct. The final history bit is the same as the current branch direction. Use of the current branch direction and the state of the 2-bit counters provides the equivalent of three bits of information. History entries are chosen that are consistent with this information yet are relatively infrequent, and should thus cause few conflicts with other branch patterns. If the shift-or-count coding is used, a shift mode bit should be appended to the left.

Global Predictor Stage Improvements

Global Stew Code

Branches can be dependent on the path taken to reach them, as has been observed in the context of compile time optimization. For example:

if (x<xmin) goto ERROR;
if (x>xmax) goto ERROR;
. . .
ERROR:
if (x<xmin) . . .

Figure 12:
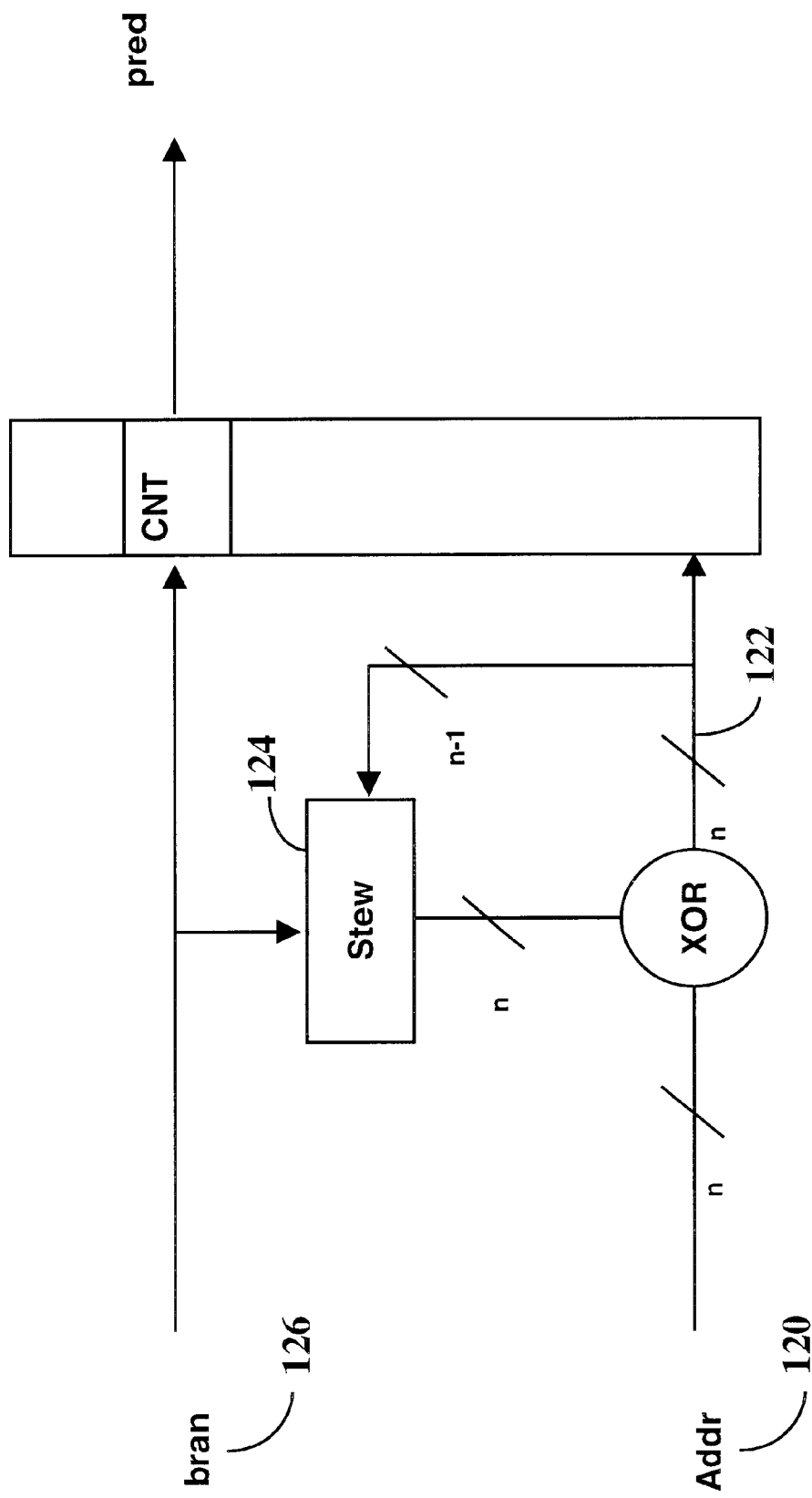
FIG. 12 is a block diagram of a predictor using stew code.

The program may reach the ERROR label because one of the branches that sent the program to the ERROR label via a GOTO statement was always taken. If the predictor knew which branch was responsible, it could easily predict the branch immediately following the ERROR label. FIG. 12 is a block diagram of a predictor using "stew" code. As with the gshare predictor, the history register is XOR'ed with the branch address on line 120, but the result on line 122 is then shifted over one bit and stored back into the history register 124. The current branch result on line 126 is shifted in to occupy the lower order bit, as before. In equation form, Stew=((Stew$_{-1}$ ⊕branch address)>>1)|branch outcome, i.e. the new stew value is calculated by exclusive-ORing the current stew value with the least significant bits of the branch address, and then shifting in the branch outcome. The so-called n-bit stew register is therefore a hashed function of the address and direction taken of the last n branches. This stew code thus incorporates path information into the global history register; the extra information can sometimes distinguish different program states that affect branch direction. This scheme also tends to spread the program state information across the bits of the register.

Conditional Prediction

Figure 13:
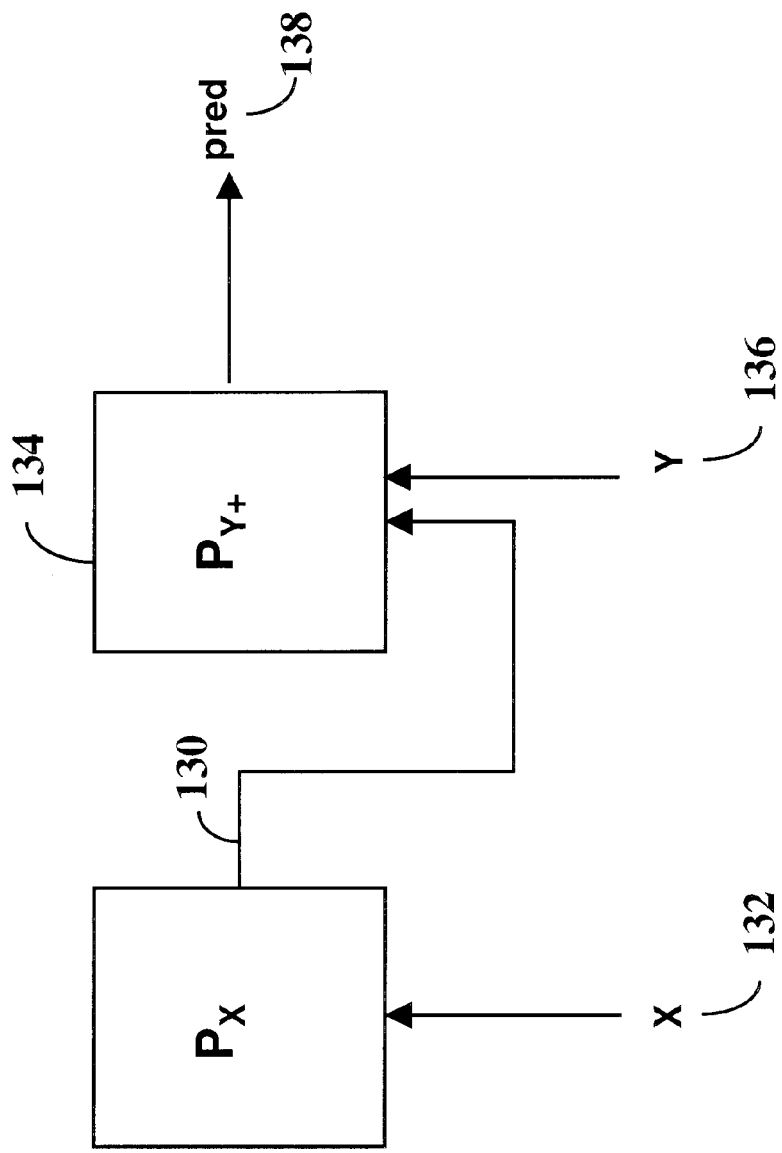
FIG. 13 is a block diagram of interstage conditional prediction in accordance with the preferred embodiment of the present invention.

FIG. 13 shows the dominance concept for a combination of two dissimilar predictors. A prediction $P_x$ on line 130, based on information X on line 132, is fed into another predictor 134 that also uses information Y on line 136 to generate a combined prediction $P_{y+}$ on line 138. For example, if the predictors are constructed from arrays of counters, the prediction $P_x$ is used as an additional address bit into the second array of counters. This structure approximates the probability function:

prob{taken|(Y and [prob(taken|X)>0.5])}>0.5 where prob(A|B) is the conditional probability of A given B.

This predictor structure provides two main advantages. First, like a parallel predictor, a conditional predictor delivers two chances of making a good prediction. The second predictor can either use the prediction of the prior stage, or for a particular input it may find that the branch is more likely to go the other direction and that the prior stage is probably wrong. Second, conditional prediction is a way of establishing the dominance relationship needed for partial dominance, namely that the second prediction value is always better than the first value. This is true because the second prediction is based on the first prediction, so even if the second prediction is not any better, it is not likely to be worse. This can be very useful once it is recognized that the second predictor does not need to include any counters where the prediction of the second stage would be the same as that of the first stage. Thus, if the first stage prediction is 90% correct, then roughly 90% of the counters in the second predictor can be expected to agree with the first stage prediction. If the agreeing counters are eliminated, the number of counters in the second predictor is reduced by 90%. Alternately, the size of the second predictor can be kept the same, but the total prediction accuracy can be increased by increasing the number of bits of Y information that is provided to the second predictor.

Global Stage Indexing

Figure 14:
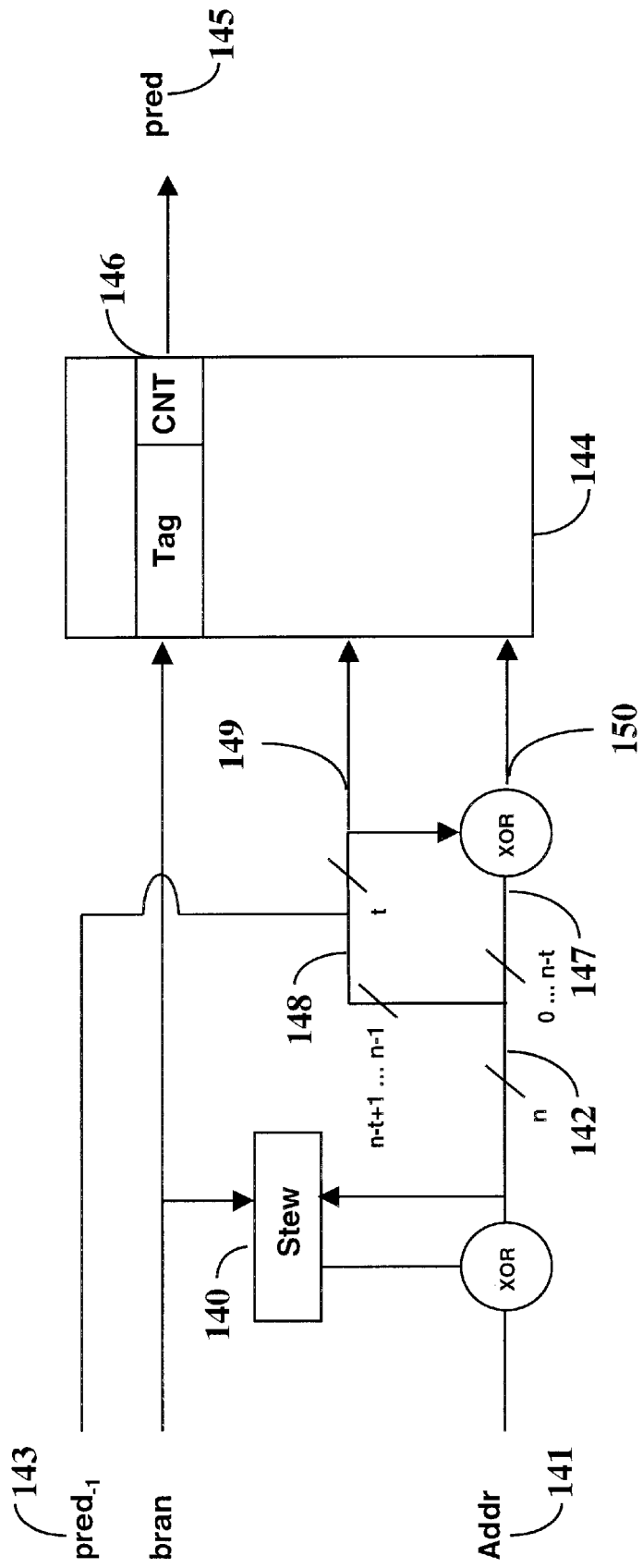
FIG. 14 is a block diagram of a global predictor stage in accordance with the preferred embodiment of the present invention.

FIG. 14 shows the global stage predictor used in the best mode SerialBLG predictor, which makes use of the stew code, conditional prediction, and partial dominance. The global information is stored in a stew register 140 as described above. The stew register value is XOR'ed with the address of the branch on line 141 to produce V on line 142:

V =Stew XOR Addr.

The previous stage prediction on line 143 is appended to this value to implement conditional prediction: $V^+=V, pred_{-1}$ The value $V^+$ provides the basis for making the global stage prediction. $V^+$ could e used to directly access an array of counters, however, as suggested above, most of these counters would be unnecessary. A better approach is to simulate a large array of counters using a cache mechanism 144. On a cache miss, it is assumed that the unavailable count would agree with the prior stage prediction. Unavailable counters are added to the cache only if the final prediction value on line 145 is wrong.

On such a replacement, the appropriate tag is set to correspond to the $V^+$ value, and the counter 146 is initialized to weakly agree with the branch causing the miss. If the cache in the global predictor stage uses LRU replacement, the LRU order is only affected when a counter is useful, i.e. generates a better prediction than the earlier stage.

Cache Tag Hashing

The method of indexing the global predictor stage cache is particularly significant. For good performance, set-associative caches require addresses that spread out fairly uniformly across the cache. For example, with a 2-way set-associative cache, if everything maps to the same set, then no more than two things can be stored, no matter how large the cache is. The $V^+$ value, even using the stew code, is still less uniformly distributed than is preferred. To improve performance, two steps can be taken. First, the high order bits on line 147 of $V^+$ are more random than the low order bits on line 148 because the high order bits on line 147 are a function of a long sequence of branches, whereas the low order bits on line 148 are a function only of the last few branches. It is therefore better to use the low order bits on line 148 for the tag value T on line 149. Second, to further increase the randomness of the remaining bits, the tag value T on line 149 can be XOR'ed into these remaining bits, Z on line 147, to obtain the set index I on line 150:

Z,T=$V^+$

I=Z XOR T

While this increases the spread of $V^+$ values in the cache, it does not affect the correspondence between $V^+$ values and counters since there is a one-to-one correspondence between I, T, and $V^+$. This is the case since $V^+$ can be reconstructed by the equation: $V^+$=(I XOR T), T FIG. 15 shows the relative sizes of the different stages in the SerialBLG predictor versus predictor size. FIG. 16 shows a table of parameters describing the best mode of the invention versus predictor size.

Other inventions not selected for inclusion in the preferred embodiment are described below.

Dominance Assurance via Valid Field

Figure 17:
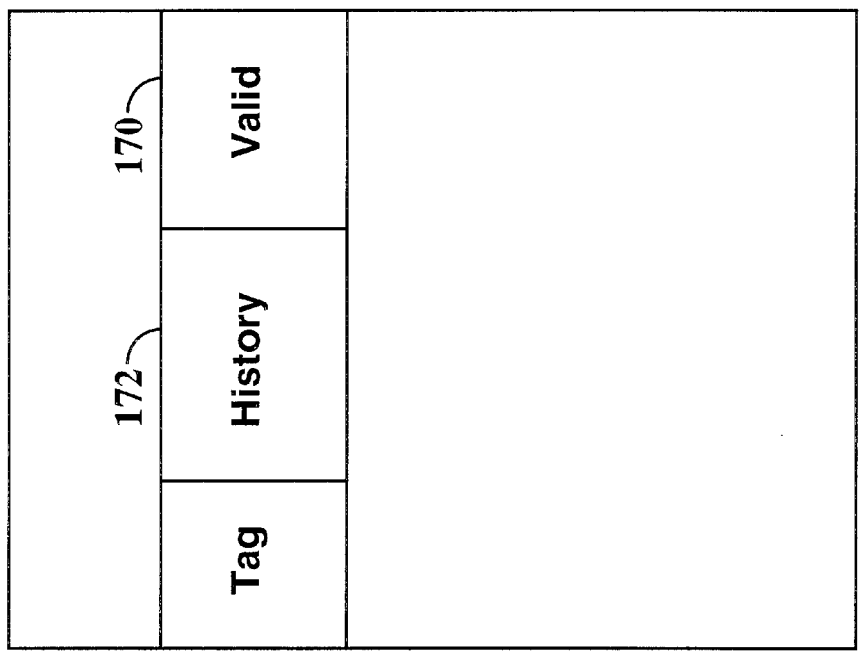
FIG. 17 is a block diagram of a local history cache with valid counter field.

FIG. 17 shows an alternate method of avoiding errors after a cache replacement in a local predictor stage by adding a valid field 170 to the cache. This field holds a count value that is reset upon replacement. On subsequent tag hits the count is incremented up to its maximum. Unless the count is at this maximum, the history entry 172 will not be used either to make a prediction or to update the counter array. Thus, all local predictions are based on a history entry that contains a minimum amount of information about the appropriate branch. Either the consistent initialization approach or the valid field approach or both can be used to maintain a high level of accuracy from the local predictor. Either approach alone has similar accuracy. For the SerialBLG predictor, the initialization-only alternative is preferred due to its relative simplicity. Adding the valid count does not further increase the prediction accuracy very much.

Loop Detector

Figure 18:
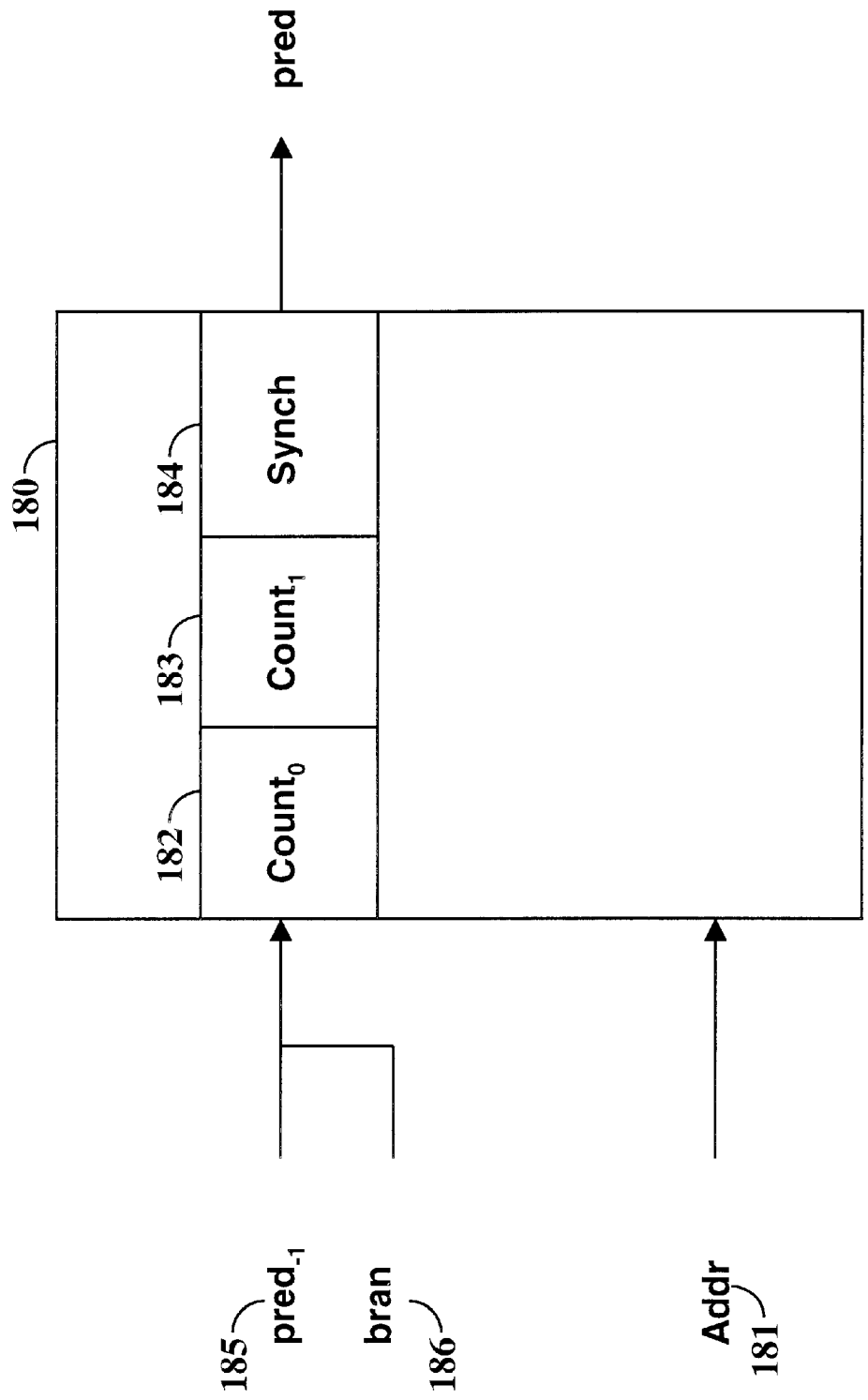
FIG. 18 is a block diagram of a loop detector mechanism.

The most common advantage of local over bimodal predictor stages is the ability to detect loops. FIG. 18 shows an alternative method of detecting loops. This technique uses an array 180 indexed by bits of the branch address on line 181. Each array entry contains two counters ($Count_0$, 182 and $Count_1$, 183) and a Synch bit 184. These values are controlled by a prediction 185 from an earlier stage predictor, and by the actual branch direction 186. The counts keep track of the distance between the last two prediction errors and the distance since the last prediction error. When the counters are equal and there is another prediction error, this indicates that there is a loop, and the Synch bit 184 is set. Thereafter, the prior stage prediction is reversed whenever the counts are equal, as long as the loop pattern repeats.

For small predictors, adding a small loop detector array to a bimodal/gshare parallel predictor is advantageous. Also, for large sizes, adding an array of loop detectors to a local/gshare parallel predictor enables loops with large iteration counts to be detected. However, for all predictor sizes, the use of a local stage predictor using the shift-or-count code is more effective.

Software Profiling

Figure 19:
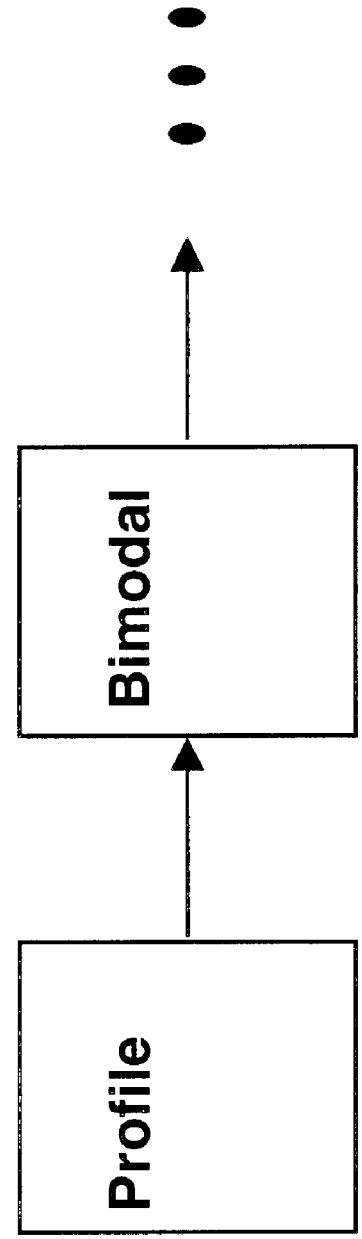
FIG. 19 is a block diagram of a software profile predictor stage.

Branch behavior information known as a profile can be gathered by pre-execution, and used to improve bimodal predictor stage accuracy. The software profile acts as an initial albeit coarse predictor stage prior to the bimodal predictor stage, as shown in FIG. 19. Stages other than the bimodal stage are not affected. A static predictor with software profiling is approximately as accurate as the dynamic bimodal predictor alone, so addition of profiling to dynamic bimodal predictor schemes is a further improvement, particularly for commonly re-used programs.

Two basic approaches to software profiling are described. The first is the use of a profile bit that can be set by a compiler in some instruction architectures. This bit indicates that a branch will usually be taken during execution. The second approach is to alter the branch instruction address to effectively create a profile bit for those architectures that do not support profile bits per se. Two counters can be maintained for each conditional branch, one that tracks the number of times the branch was taken and one which tracks the number of times the branch was not-taken. The program code is then changed as follows: if the taken count exceeds the not-taken count, the branch address is made even by adding a NOP before the branch if necessary; if the taken count is less than or equal to the not-taken count, the branch address is made odd by adding a NOP before the branch if necessary. Each time a conditional branch is encountered, the low order bit serves as an equivalent profile bit. The bimodal counter array is indexed using a concatenation of the least significant bits of the branch address with the profile bit to reduce destructive inter-branch interference. If two branches are mapped to the same direction, it is likely that they both will go in the same direction, and will thus update the counter in the same direction. Furthermore, a new branch will be mapped to a counter of a branch biased to the same direction, so it has a better chance to be predicted correctly at the first time it is predicted. This scheme is not limited by predictor size, features lower training time on startup or phase change, and degenerates to the usual bimodal predictor if the profile is wrong, missing, or changes over time.

Partial Local Counter Array

Figure 20:
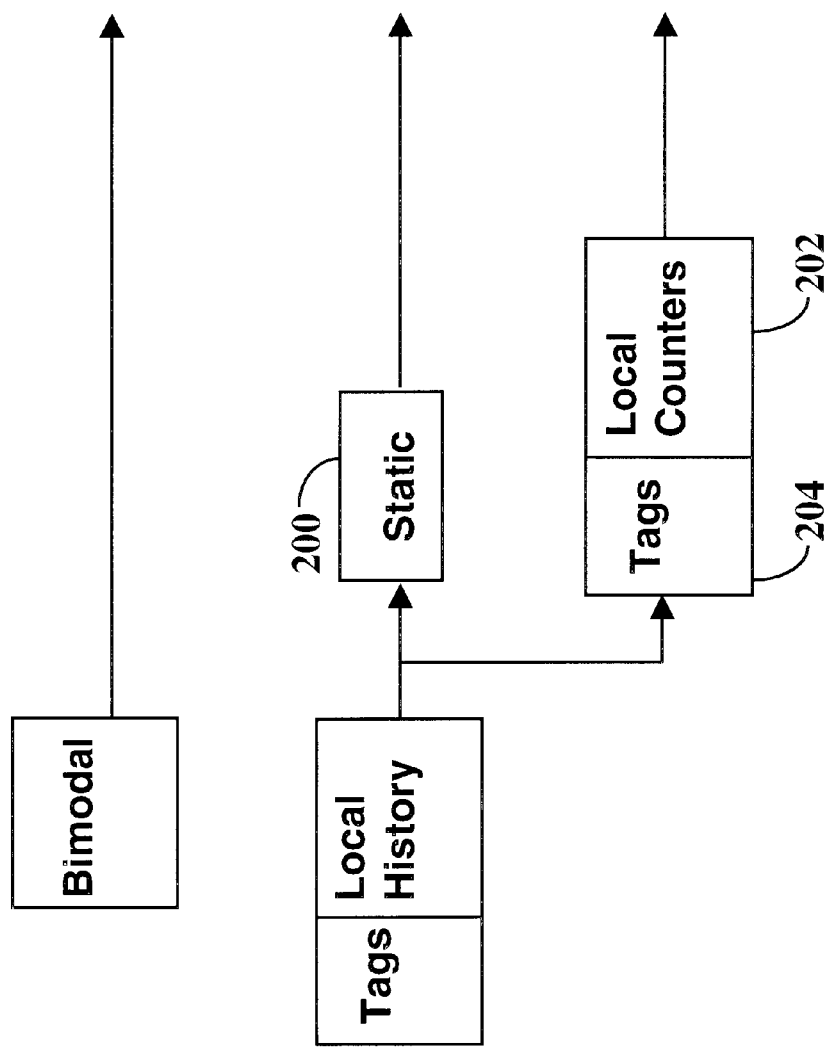
FIG. 20 is a block diagram of a partial local counter array.

Perhaps ninety percent of the counters in a local predictor stage are redundant with those in the bimodal predictor stage. Some branch histories, such as NTNTNT or NTTNTT, commonly cause bimodal stage mispredictions that require local predictor override. A method of simultaneously solving these two problems is depicted in FIG. 20. Static management 200 handles the more common bimodal errors. A partial local counter array 202 adaptively predicts branch-specific patterns. The local counter array is protected by tags 204, and is used and updated only when there is a tag match. Counters are replaced only in those cases when the static predictor block is wrong.

While the invention has been described with reference to a specific embodiment, the description is intended for purposes of illustration only and should not be construed in a limiting sense. Various modifications of and changes to the disclosed embodiment, as well as other embodiments of the invention, will be apparent to those of ordinary skill in the art, and may be made without departing from the true spirit of the invention. It is therefore contemplated that the language of the following claims will cover any such modifications or embodiments which fall within the true scope of the invention.

What is claimed is:

1. A serial branch predictor for predicting a direction of branches in the execution of instructions in a computer program, comprising:
   a first branch predictor stage operating according to a first algorithm to generate a first signal representative of the predicted direction of a branch; and
   at least one subsequent branch predictor stage, each subsequent branch predictor stage,
      being serially coupled to a preceding branch predictor stage,
      receiving at least one input including a signal representative of the predicted direction generated by the preceding branch predictor stage, and
      operating upon the at least one input according to a different algorithm to generate a signal representative of the predicted direction of a branch.

2. The serial branch predictor as in claim 1 wherein the at least one subsequent branch predictor stage comprises a cache memory storing entries of history information, the entries being dynamically allocable, updateable, and replaceable.

3. The serial branch predictor as in claim 2 wherein the predicted direction of the preceding stage is output by the at least one subsequent stage if there is no entry corresponding to the branch.

4. The serial branch predictor as in claim 2 wherein the cache memory entries are indexed by the signal representative of the predicted direction generated by the preceding branch predictor stage.

5. The serial branch predictor as in claim 4 wherein the cache memory entries are further indexed by a bit from a global history register.

6. The serial branch predictor as in claim 2 wherein the cache memory entries are not replaced if the predicted direction of the preceding branch predictor stage is correct.

7. The serial branch predictor as in claim 2 wherein the cache memory entries are not replaced if the predicted direction of a final branch predictor stage is correct.

8. The serial branch predictor as in claim 2 wherein the cache memory entries are updated only if an updated cache memory entry provides an improved predicted direction in relation to the predicted direction of the preceding branch predictor stage.

9. The serial branch predictor as in claim 1 wherein each of the at least one subsequent branch predictor stage comprises a counter indexed by the signal representative of the predicted direction generated by the preceding branch predictor stage.

10. The serial branch predictor as in claim 9 wherein the at least one subsequent branch predictor stage comprises a global predictor.

11. The serial branch predictor as in claim 10 wherein the first branch predictor stage comprises a bimodal predictor.

12. The serial branch predictor as in claim 11 wherein the at least one subsequent branch predictor stage comprises a local predictor coupled between the bimodal predictor and the global predictor.

13. The serial branch predictor as in claim 1 wherein the at least one subsequent branch predictor stage comprises a local predictor including a cache memory for storing entries of branch history, the entries being dynamically allocable, updateable, and replaceable.

14. The serial branch predictor as in claim 13 wherein the predicted direction of the preceding stage is output by the branch predictor stage if there is no entry corresponding to the branch.

15. The serial branch predictor as in claim 13 wherein the cache memory entries are indexed by the signal representative of the predicted direction generated by the preceding branch predictor stage.

16. The serial branch predictor as in claim 13 wherein the cache memory entries are not replaced if the predicted direction of the preceding branch predictor stage is correct.

17. The serial branch predictor as in claim 13 wherein the cache memory entries are not replaced if the predicted direction of a final branch predictor stage is correct.

18. The serial branch predictor as in claim 13 wherein the cache memory entries are updated only if an updated cache memory entry provides an improved predicted direction in relation to the predicted direction of the preceding branch predictor stage.

19. The serial branch predictor as in claim 13 wherein a cache memory of entries storing branch counter information, the branch counter entries being dynamically allocable, updateable, and replaceable.

20. The serial branch predictor as in claim 13 wherein replaced branch history entries comprise information consistent with the predicted direction of the preceding branch predictor stage and a current direction of the branch.

21. The serial branch predictor as in claim 13 wherein allocated branch history entries comprise information consistent with the predicted direction of the preceding branch predictor stage and a current direction of the branch.

22. The serial branch predictor as in claim 3 wherein each entry is stored in a register, the register including a mode bit for switching between a history storage mode and a counter mode, and a shift field in history storage mode and a branch bias bit and counter field in counter mode, the mode bit being set when all the bits in the shift field represent the same branch direction, the branch bias bit representing the branch direction and the counter field saturating at a predefined value, and the mode bit being reset when the branch changes direction.

23. The serial branch predictor as in claim 1 wherein the first branch predictor stage comprises a static predictor.

24. The serial branch predictor as in claim 23 wherein during compilation of the computer program, the first algorithm sets a bit representing the predicted direction.

25. The serial branch predictor as in claim 23 wherein the first algorithm comprises a program compilation algorithm which
counts a first number representative of the number of times a branch is taken and counts a second number representative of the number of times the branch is not taken,
makes a branch address even if the first number is greater than the second number, and else
makes the branch address odd, and
wherein a plurality of low order bits represent the predicted direction.

26. A branch predictor comprising:
a serial connection of two dissimilar predictor stages, a first prediction output of the first predictor stage being used directly in the computation of a second prediction output of the second predictor stage.

27. The branch predictor as in claim 26, wherein the second predictor stage comprises an array of prediction counters and wherein the first prediction output and other information available to the second predictor stage is used to index a prediction counter used in computing the second prediction output.

28. A method of predicting a direction of branches in the execution of instructions in a computer program, comprising the steps of:
using a first algorithm to make a first prediction of the direction of a branch;
providing the first prediction to a second algorithm;
using the second algorithm to make a second prediction of the direction of the branch, the second algorithm overruling the first prediction if the second prediction is likely to improve over the accuracy of the first prediction.

* * * * *